(12) United States Patent
Thiele et al.

(10) Patent No.: US 12,336,502 B1
(45) Date of Patent: Jun. 24, 2025

(54) PET WASHTUB

(71) Applicant: Elevate Premium Dog Tubs, Afton, MN (US)

(72) Inventors: Rian Thiele, Afton, MN (US); Mike Osborn, Afton, MN (US)

(73) Assignee: ELEVATE PREMIUM DOG TUBS, Afton, MN (US)

( * ) Notice: Subject to any disclaimer, the term of this patent is extended or adjusted under 35 U.S.C. 154(b) by 0 days.

(21) Appl. No.: 18/649,941

(22) Filed: Apr. 29, 2024

(51) Int. Cl.
*A01K 13/00* (2006.01)

(52) U.S. Cl.
CPC .................................. *A01K 13/001* (2013.01)

(58) Field of Classification Search
CPC ..... A01K 13/001; A01K 13/003; A01K 13/00
See application file for complete search history.

(56) References Cited

U.S. PATENT DOCUMENTS

| | | | | |
|---|---|---|---|---|
| 2,555,805 | A * | 6/1951 | Miller | B63B 21/045 24/132 R |
| 4,057,032 | A * | 11/1977 | Dimitriadis | A61D 11/00 119/671 |
| 5,448,966 | A * | 9/1995 | McKinnon | A01K 13/001 119/676 |
| 5,794,570 | A * | 8/1998 | Foster | A01K 13/001 119/673 |
| 7,921,812 | B1 * | 4/2011 | Carrillo | A01K 13/001 119/602 |
| D770,694 | S | 11/2016 | Beilinson | |
| 10,952,408 | B1 * | 3/2021 | Frost | A01K 13/001 |
| 11,033,001 | B2 | 6/2021 | Zhang | |
| D925,842 | S | 7/2021 | Jeon | |
| 11,388,886 | B2 | 7/2022 | Miller et al. | |
| 11,582,950 | B2 | 2/2023 | Kim et al. | |
| 2007/0039559 | A1 * | 2/2007 | Foster | A01K 13/001 119/676 |

(Continued)

FOREIGN PATENT DOCUMENTS

| | | | | |
|---|---|---|---|---|
| CN | 106889924 A | * | 6/2017 | ............. A47K 3/001 |
| KR | 200372902 Y1 | * | 1/2000 | ........... A01K 27/003 |

(Continued)

OTHER PUBLICATIONS

Model LT101 Dog Bath. Datasheet [online]. New Breed Dog Baths, 2023 [retrieved on May 3, 2024]. Retrieved from the Internet: http://newbreedtubs.com/ModelLT101.html.

*Primary Examiner* — Ebony E Evans
(74) *Attorney, Agent, or Firm* — PITT I.P.; Jacob E. Pittman

(57) ABSTRACT

A novel pet washtub defines a substantially rectangular-prism-shaped outer profile and includes: a front end with a front step and defining an entryway into a grooming space of the tub; a back end configured to be positioned against a back wall of a room; a left side; and a right side. In certain examples, a front width of the tub is marginally less than a back width of the tub, such that the pet washtub defines a narrow taper along a back-to-front direction to facilitate the groomer's maneuvering around the perimeter of the tub while grooming. When the washtub is installed in a corner, a customized adaptor can be installed to occlude the gap formed between the sidewall of the washtub and the wall of the room. In some such examples, the corner adaptor is invertible, and can be installed on either lateral side of the tub.

18 Claims, 14 Drawing Sheets

(56) References Cited

U.S. PATENT DOCUMENTS

| | | |
|---|---|---|
| 2011/0297103 A1 | 12/2011 | Iou |
| 2015/0366163 A1* | 12/2015 | Carter ................. A01K 13/001 |
| | | 119/678 |
| 2018/0206449 A1* | 7/2018 | Zhang .................... A46B 13/02 |

FOREIGN PATENT DOCUMENTS

| | | | | |
|---|---|---|---|---|
| KR | 200433009 Y1 | | 12/2006 | |
| KR | 20120091922 A | | 8/2012 | |
| KR | 20170116537 A | * | 10/2017 | ............... A47K 3/02 |
| KR | 101913963 B1 | | 10/2018 | |
| KR | 20200056142 A | | 5/2020 | |
| WO | WO-2014205446 A1 | * | 12/2014 | ........... A01K 13/001 |

* cited by examiner

PET WASHTUB

TECHNICAL FIELD

The present technology is generally related to bathing and grooming of non-human companion animals.

BACKGROUND

Compassionate persons may help care for one or more non-human companion animals, such as dogs, cats, and birds. Just like their human counterparts, companion animals may require periodic bathing and grooming. For instance, a pet owner may send their companion animal to a professional pet-groomer, where the animal is washed, brushed, and dried in a bathtub or washtub. Some existing washtubs feature a number of design flaws, such as materials that degrade over time, small nooks and crannies where water and moisture get trapped and grow mold and mildew over time, and even structural defects prone to cracking and breaking under the weight of a pet.

SUMMARY OF THE DISCLOSURE

The techniques of this disclosure generally relate to various novel and useful features of a pet washtub. In some examples, the pet washtub defines a substantially rectangular-prism-shaped outer profile, and includes: a front end having a front step and defining an entryway into an interior grooming space of the tub; a back end configured to be positioned adjacent to a back wall of a room; a left side; and a right side. In some such examples, a front width of the front end of the tub is smaller than a back width of the back end of the tub, such that the tub defines a narrow taper along its back-to-front direction. Among other useful features described herein, the washtub can include a ventilation ledge running along its bottom edge to allow airflow up into the interior of the tub to inhibit the growth of mold and mildew over time.

The details of one or more aspects of the disclosure are set forth in the accompanying drawings and the description below. Other features, objects, and advantages of the techniques described in this disclosure will be apparent from the description and the drawings, and from the claims.

BRIEF DESCRIPTION OF THE DRAWINGS

The disclosure can be more completely understood in consideration of the following detailed description of various embodiments of the disclosure, in connection with the accompanying drawings, in which.

Figure 1:
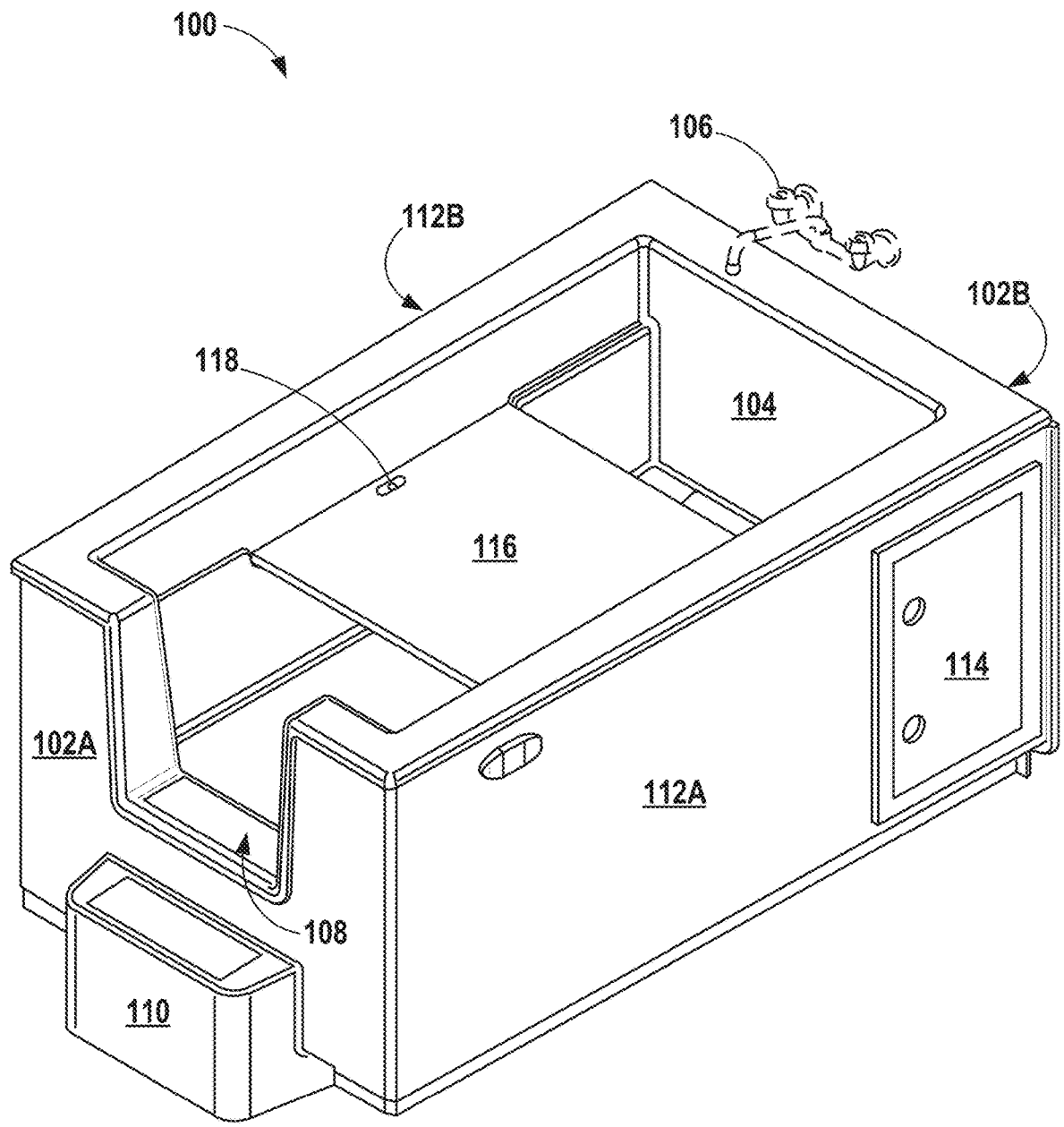
FIG. 1 is a perspective view of a pet washtub, in accordance with various techniques of the present disclosure.

While examples of this disclosure are amenable to various modifications and alternative forms, specifics thereof shown by way of example in the drawings will be described in detail. It should be understood, however, that the intention is not to limit the disclosure to the particular examples described.

DETAILED DESCRIPTION

The present disclosure describes various example features of a pet washtub for grooming small-to-medium-sized companion animals, such as dogs, cats, rabbits, guinea pigs, ferrets, and the like. FIG. 1 is a perspective view of one such pet washtub 100. In general, the outer profile of pet washtub 100 substantially conforms to a rectangular-prism shape (or "form factor"). For instance, pet washtub 100 features a front end 102A, and a back end (or "rear" end) 102B positioned opposite (and parallel to) front end 102A. In between the front and rear ends 102A/102B, washtub 100 defines an open interior grooming space 104 (or "cavity" or "volume") for receiving a supply of water from a faucet 106 to wash or otherwise groom a companion animal (not shown). The grooming space 104 can be substantially rectangular, for instance, having a back-to-front length of between about 55 and 60 inches (e.g., about 57 inches), and a left-to-right width of between about 30 and 35 inches (e.g., about 31 inches). In some examples, the water faucet 106 may be an integral component of washtub 100. In other examples (such as the example shown in FIG. 1), pet washtub 100 may be with the back end 102B positioned underneath an existing faucet 106. In other examples, the back end 102B can define an aperture through which a faucet 106 (and the accompanying plumbing) may be connected.

As shown in FIG. 1, the tub's front end 102A defines an entryway 108 through which the companion animal can access the washing space 104, as well as a helpful front step 110 for smaller animals to reach the front entryway 108. For instance, the front entryway can be between about 16 and 20 inches (e.g., about 18.0 or 18.1 inches) above the ground, and the top of the front step can be about 10 to 14 inches (e.g., about 12 inches) above the ground. In some examples, including the front step 110, the washtub 100 can define a total front-to-back length of between about 69 inches and 77 inches (e.g., about 73 inches total).

As defined from the tub's "perspective" (i.e., when facing "forward" from the back end 102B toward the front end 102A), the washtub 100 includes a substantially rectangular "left" sidewall 112A and a substantially rectangular "right" sidewall 112B. In the configuration depicted in FIG. 1 (but not in all configurations, as explained further below), the left sidewall 112A features an access panel 114 through which a user can access internal components of washtub 100, such as plumbing components (not shown). In some examples, the rectangular aperture defined by the access panel can be about 18-24 inches tall (e.g., about 21.25 inches tall), and about 10-16 inches wide (e.g., about 13.25 inches wide), as measured along a front-to-back direction of the washtub 100.

In some examples, pet washtub 100 includes a removable height-adjustment platform 116 that may be used when grooming smaller-sized companion animals, such as a chihuahua or a hamster. In such cases, platform 116 can be placed within washing space 104, and the companion animal may be placed on top of the platform 116 and secured (e.g., via a leash) to one or more anchor points 118 defined by the platform 116. In the example of FIG. 1, anchor point 118 includes a metal pin or peg that extends across an oval-shaped aperture defined by the platform 116. The platform may assume any suitable shape or form factor, such as a substantially rectangular-prism shape. For instance, the platform 116 can define a front-to-back length of between about 25 inches and about 30 inches, such as about 27 inches. Similarly, the platform 116 can define a left-to-right width of between about 27 inches and about 33 inches, such as about 29.5 inches. The platform 116 may be formed from a sufficiently dense, heavy material, such as a heavy plastic or resin, metal, or fiberglass, such that a small companion animal is not strong enough to dislodge the platform 116 from within the grooming space 104, particularly not when the companion animal is standing directly on top of the platform.

Figure 2:
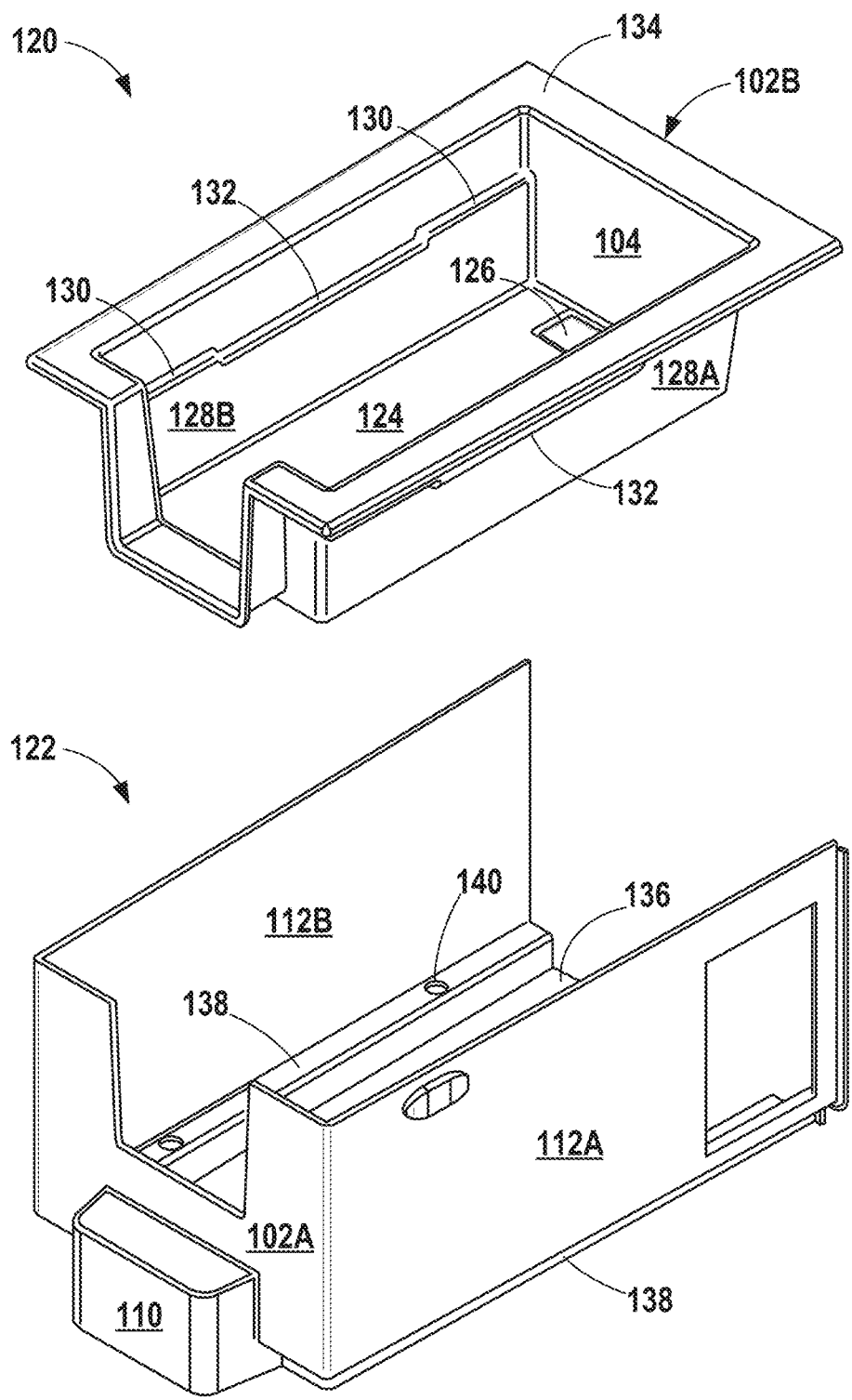
FIG. 2 is a exploded perspective view of a portion of the pet washtub of FIG. 1.

FIG. 2 is a partial exploded view of the pet washtub 100 of FIG. 1. As shown in FIG. 2, washtub 100 is primarily formed from two waterproof "shells" or layers nested together: an "inner" basin 120, and an "outer" housing 122. Inner basin 120 and outer housing 122 may be formed from any suitably durable, water-resistant material, such as fiberglass. Preferably, basin 120 and housing 122 are not formed from wood or any other similar organic-based materials that are likely to degrade and/or promote the growth of mold and mildew over relatively short spans of time.

Inner basin 120 forms the perimeter of interior washing space 104. A bottom surface 124 of basin 120 features a drain 126 for draining wastewater out from the tub 100 after pet grooming is complete. For instance, the bottom surface 124 of the basin can feature a declined angle of about 0.3° below the horizontal such that wastewater flows backward toward the drain 126. Near the back end of inner basin 120, the grooming space 104 can have a vertical height of between about 14 and about 22 inches (e.g., about 18 inches), as measured between the drain 126 and the top of the basin 120. In some examples, drain 126 is integrally formed with a plurality of elongated slits in order to trap a significant portion of the pet's loose hair before it runs down the drain, helping to reduce instances of drain clogs. Each of the inner basin's sidewalls 128A, 128B features an elongated ledge or lip 130 running along a back-to-front direction. For instance, the ledges 130 may be positioned between about 5 inches and 9 inches (e.g., about 7 inches) below the top of inner basin 120. The elongated lips 130 each feature a central depression 132 (or depressed length) that is sized to retain height-adjustment platform 116 (FIG. 1), i.e., is incrementally longer than the front-to-back length of height-adjustment platform 116. When platform 116 is inserted between the opposing central depressions 132, the platform 116 is prevented from moving backward or forward along the rest of elongated lips 130.

A top surface 134 of inner basin 120 extends circumferentially around an upper rim of basin 120. Top surface 134 can function as a countertop or shelf upon which objects, such as shampoo bottles, brushes, etc., may be placed during grooming. For instance, near the back end 102B of the tub, the top surface 134 can define a width of about 6 inches, as measured radially outward from the outer edges of grooming space 104. When washtub 100 is fully assembled, the uppermost surface of top surface 134 may be between about 30 inches and about 38 inches (e.g., about 34.0 inches) above the ground.

Outer housing 122 includes a pair of opposing sidewalls that make up the rectangular sidewalls 112A, 112B of washtub 110. Notably, as shown in FIG. 2, sidewalls 112A, 112B do not extend fully downward to a bottom-most surface 136 of washtub 110. Instead, a ventilation ledge 138 extends circumferentially around the bottom edge of sidewalls 112A, 112B and of a portion of front end 102A. Ventilation ledge 138 defines a plurality of ventilation holes 140 that allow an ample supply of fresh air to enter upward into the space in between the outer surfaces of basin sidewalls 128A/128B and the inner surfaces of housing sidewalls 112A/112B. This flow of air promotes the swift evaporation of any stray moisture that should find its way into this space, thereby substantially inhibiting the growth of mold or mildew within washtub 100. In some examples, the ventilation ledge 138 can be positioned between about 3.6 and 4.0 inches (e.g., about 3.8 inches) above the ground.

Unlike housing sidewalls 112A/112B, front step 110 extends all the way down to the bottom-most surface 136 (i.e., the "ground" surface) of housing 122 (and by extension, of washtub 100). That is, front step 110 occupies a portion of ventilation ledge 138 along the front end 102A. By extending fully toward the ground, front step 110 enjoys enhanced structural support against even the heaviest of companion animals to stand upon it.

As outer housing 122 constitutes the outer-most visible portion of washtub 100, the exterior surface of the housing can include any number of features to increase the aesthetic appeal of washtub 100 for pets and their owners alike. That is, by conveying a more pleasing, less "cold and sterile" appearance, certain timid pets may be less apprehensive about using the tub, thereby greatly facilitating the grooming process. For instance, an exterior surface of outer housing 122 can include a vibrant, colorful appearance, either through decorative materials embedded directly into the surface, or via a coating or layer adhered on top. As one illustrative, non-limiting example, the exterior surface of outer housing 122 can include a colorful, "sparkly" profile, such as the kind commonly found in certain fiberglass-based watercraft.

Figure 3A:
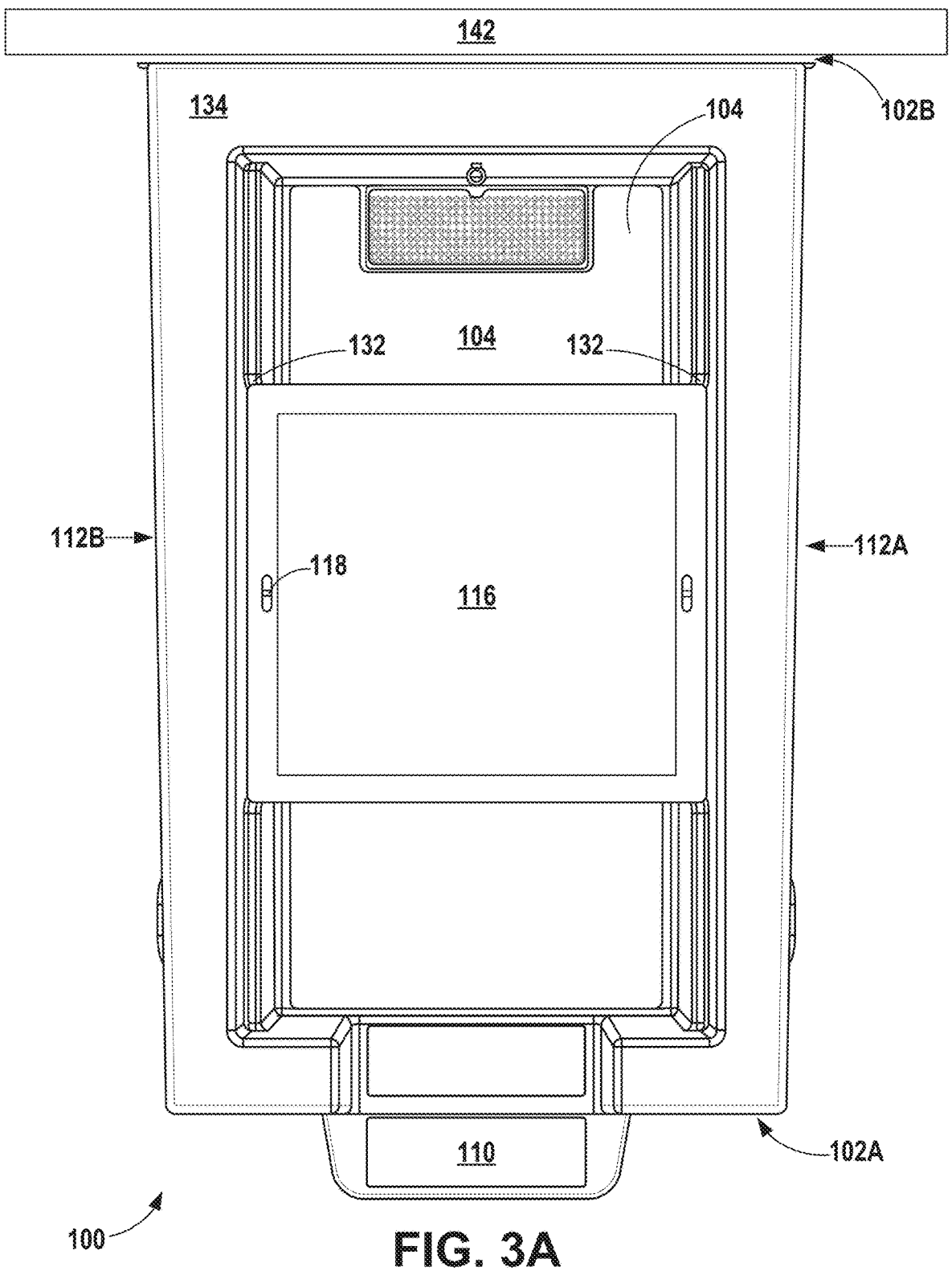
FIG. 3A is a top view or overhead view of the pet washtub of FIGS. 1 and 2, installed with its rear end up against a flat wall.

FIG. 3A is a top view or overhead view of pet washtub 100 of FIGS. 1 and 2. As noted above, washtub 100 substantially, but not entirely, conforms to a rectangular-prism-type form factor. That is, as viewed most clearly from the overhead perspective in FIG. 3A, the outer profile of washtub 100 features a slight taper along a back-to-front direction, such that the top surface 134 of inner basin 120 defines a trapezoidal, rather than strictly-rectangular, perimeter. In equivalent terms, the left housing sidewall 112A and the right housing sidewall 112B are oriented non-parallel to one another. This subtle taper has been found to greatly improve the ability of the groomer to navigate around the exterior of the tub when leaning over to wash a companion animal stationed within the interior grooming space 104.

In more precise terms, the front end 102A of washtub 100 has a narrower left-to-right width than the back end 102B of washtub 100. For instance, the front end 102A may be about 85% to about 95% (e.g., about 90-93%) as wide as the back end 102B of washtub 100. As one illustrative, non-limiting example, the back end 102B can be about 43.3 inches wide, and the front end 102A can be about 39.7 inches to about 40 inches wide.

In the configuration shown in FIG. 3A, pet washtub 100 is shown to be assembled with its back end 102B positioned up against a flat wall 142 (for clarity, a "back" wall) of a room, i.e., a wall 142 that extends at least some lateral distance past either side of the back end 102B of washtub 100.

Figure 3B:
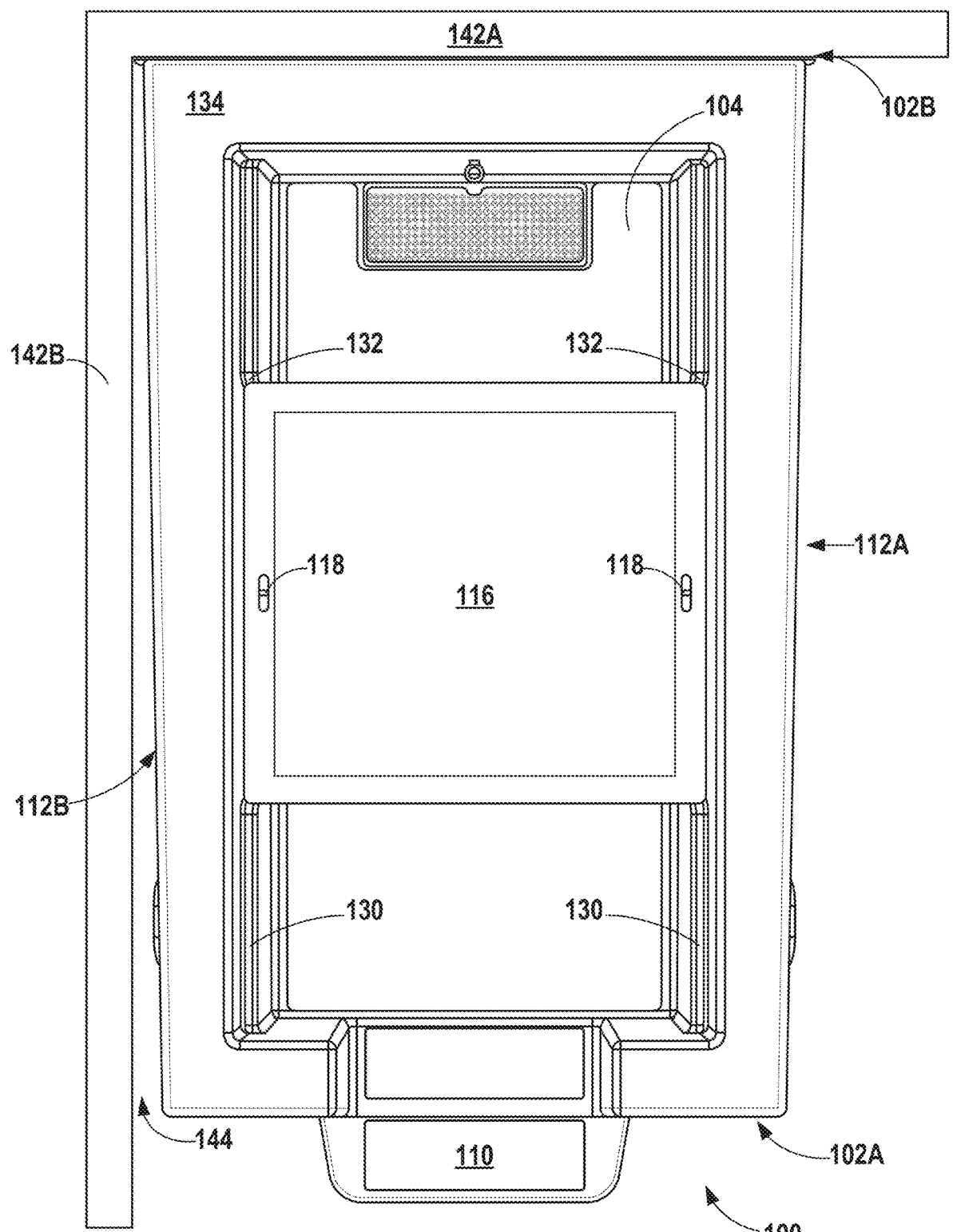
FIG. 3B is a top view or overhead view of the pet washtub of FIGS. 1-3A, installed with its rear end and right sidewall positioned in the corner of a room.

In some other cases, such as the example shown in FIG. 3B, a user may wish to install washtub 100 in the corner of a room, such that the rear end 102B is adjacent a first wall (or "back" wall) 142A, and one of the sides 112A/112B of the tub is adjacent a second wall (or "side" wall) 142B that is oriented perpendicular to the first wall 142A. In such cases, the tapered outer profile of washtub 100 initially forms an elongated triangular (or "wedge"-shaped) gap 144 in between the tub's sidewall 112B and the room's sidewall 142B. For some users, the wedge-shaped gap 144 may be undesirable since small objects, such as keys and change, may be difficult to retrieve should they fall into the gap.

Figure 4:
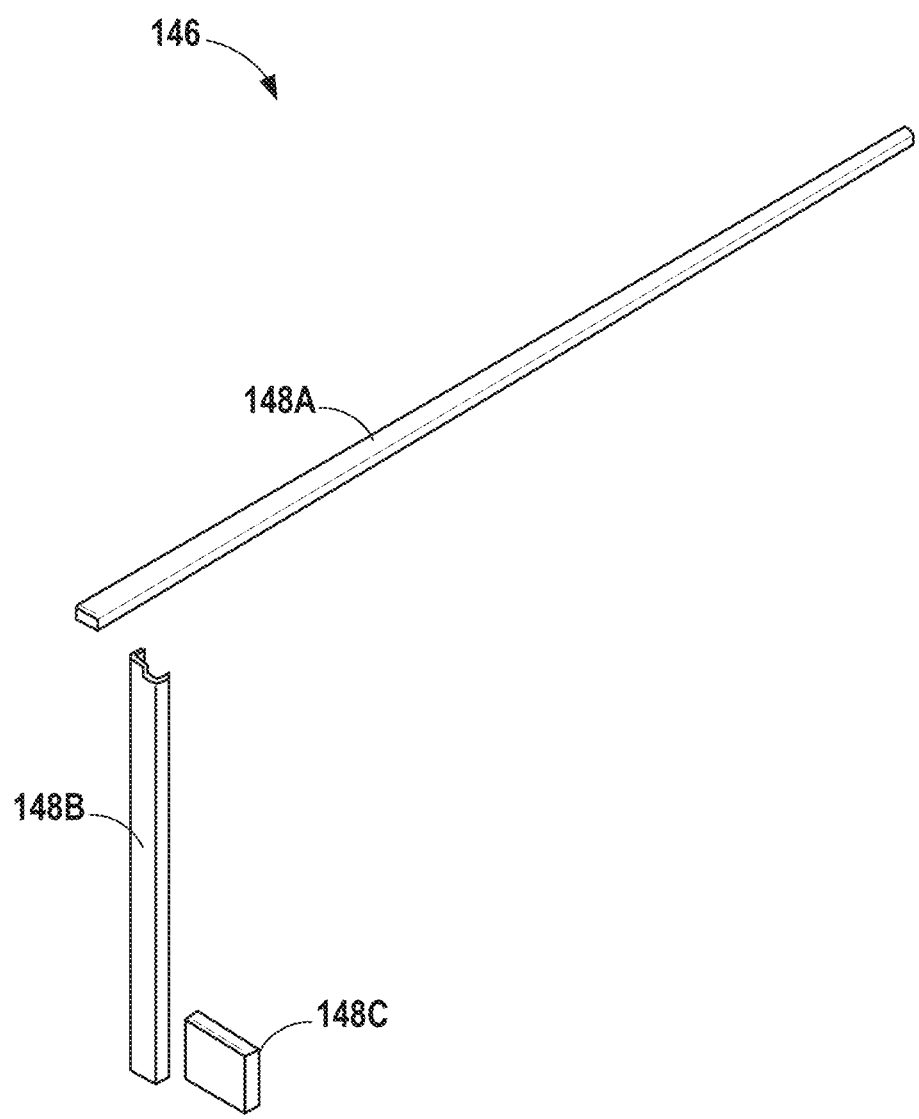
FIG. 4 is an exploded perspective view of a corner adaptor for the pet washtub of FIGS. 1-3B.

Accordingly, in some examples in accordance with the techniques of this disclosure, pet washtub 100 includes a customized "corner adaptor" specifically tailored to occlude this gap 144 in room-corner installations. FIG. 4 is a perspective view of one such adaptor 146, and FIGS. 5A and 5B show the adaptor 146 assembled in place along the right sidewall 112B of washtub 100.

Figure 5A:
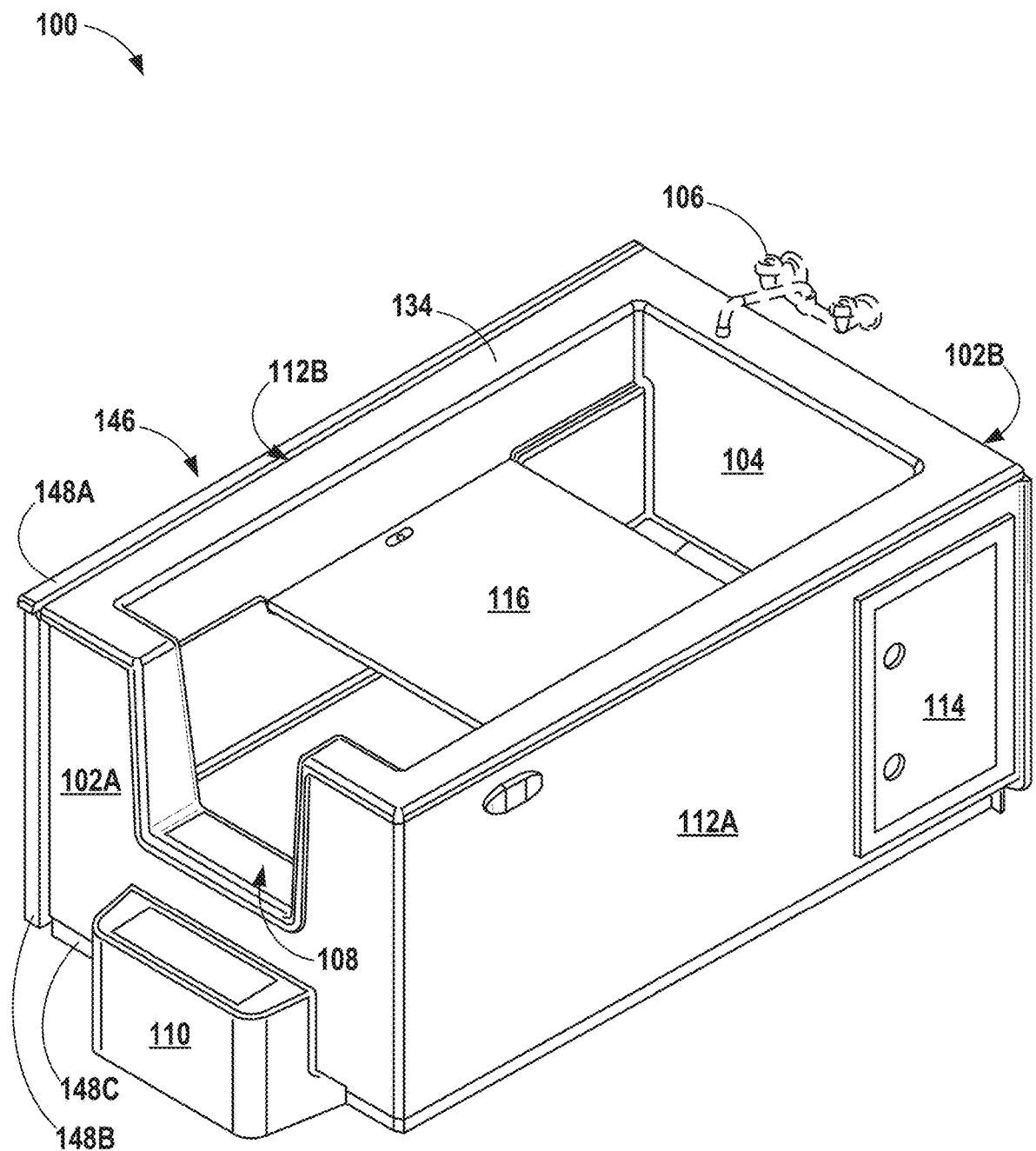
FIG. 5A is a perspective view of the pet washtub of FIGS. 1-3B with the corner adaptor of FIG. 4 assembled in a first configuration along the right sidewall of the washtub.
Figure 5B:
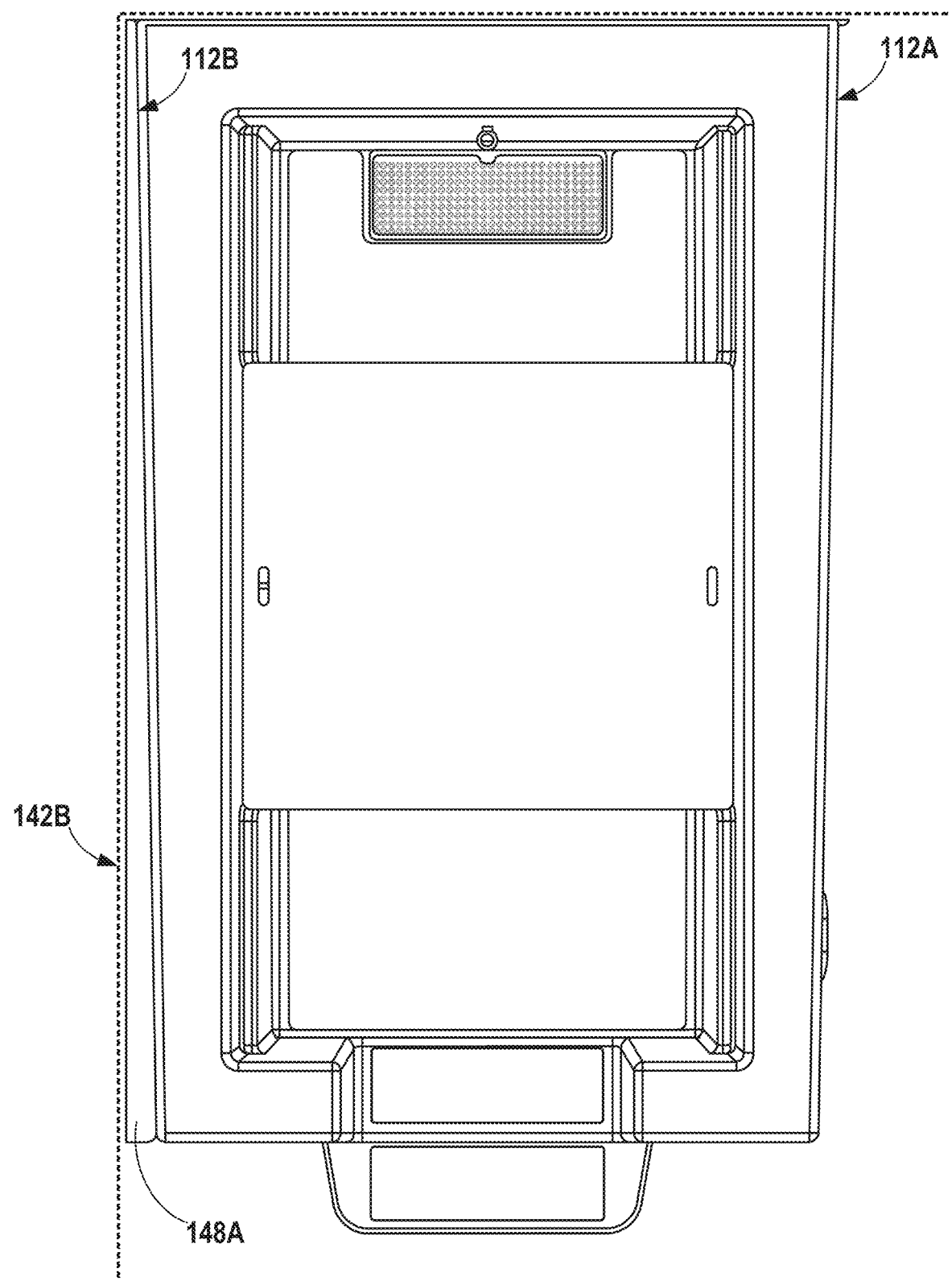
FIG. 5B is a top view or overhead view of the pet washtub and adaptor of FIG. 5A.

In the example shown in FIGS. 4 and 5A, corner adaptor 146 includes three discrete components: a top wedge 142A, a base wedge 148B, and a base toe cap 148C. These three components may be snapped, clipped, screwed, adhered, caulked, or otherwise coupled in place between washtub 100 and the sidewall 142B.

Top wedge 148A substantially conforms to the top surface 134 of inner basin 120. That is, top wedge 148A forms an elongated triangular shape, and preferably shares a color and texture with inner basin 120, such that, when assembled accordingly, top wedge 148A forms a "continuous" outer extension of the top surface 134 of basin 120.

Conversely, base wedge 148B and base toe cap 148C preferably both conform (e.g., in color, texture, etc.) to the appearance of the exterior surface of outer housing 122. As shown in FIG. 5A, base wedge 148B is an elongated rectangular component, configured to occlude a portion of gap 144 along the front end 102A of washtub 100. While toe cap 148C similarly conforms to a rectangular-prism form factor, this component is substantially less elongated than base wedge 148B, and more-closely approximates a square shape along its front-most surface. In particular, base toe cap 148C is configured to occlude a square-shaped portion of gap 144 defined by ventilation ledge 138 extending along a bottom edge of washtub 100.

Figure 5C:
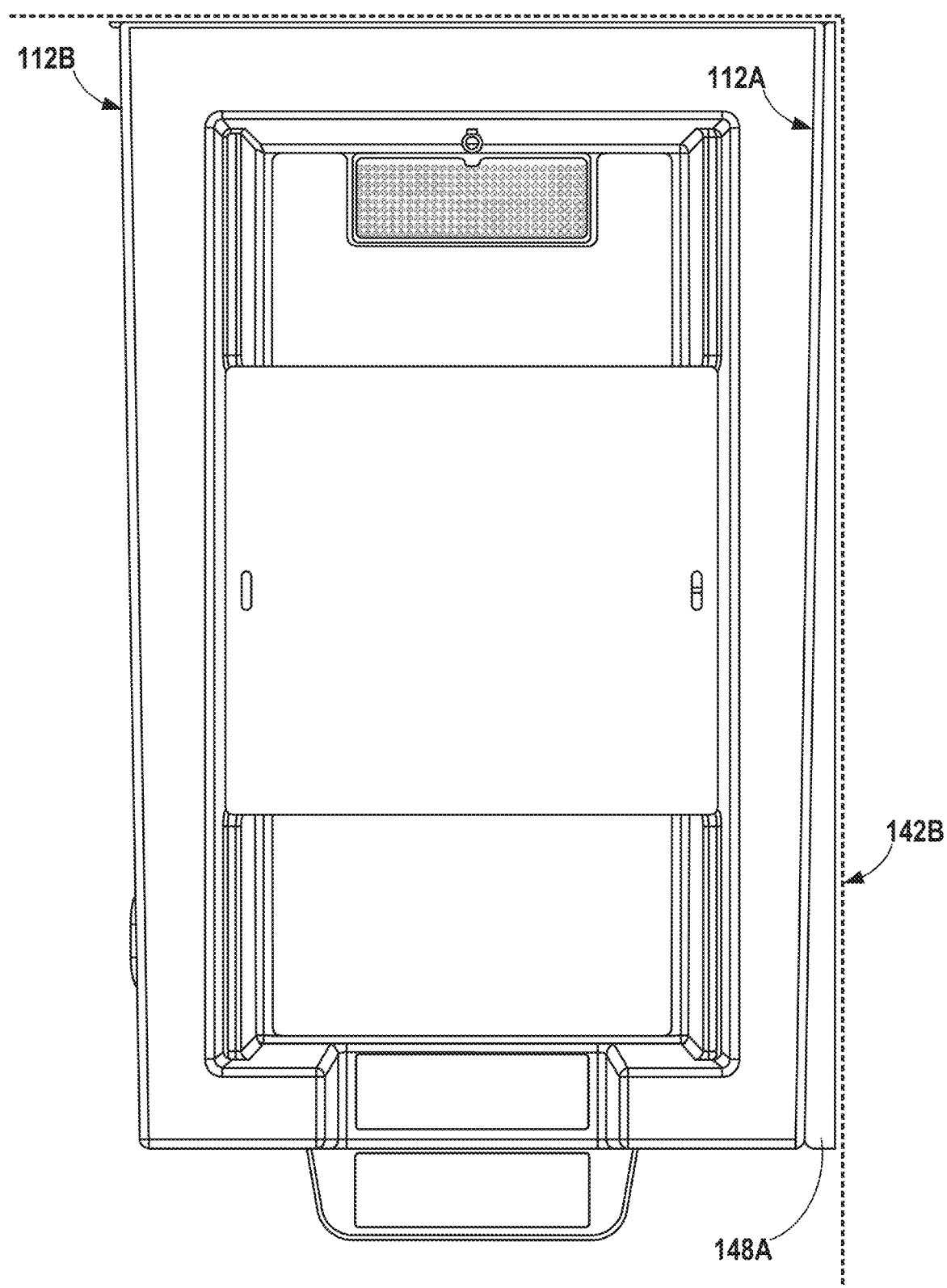
FIG. 5C is a top view or overhead view of the pet washtub of FIGS. 1-3B with the corner adaptor of FIG. 4 assembled in a second configuration along the left sidewall of the washtub.

In some examples (but not all examples), corner adaptor 146 is configured to be "reversible," in that the same three components 148A-148C may be assembled along either sidewall 112A/112B of washtub 100. For instance, in the example shown in FIG. 5C, the three components 148A-148C of corner adaptor 146 have been "inverted" (e.g., flipped upside-down), and installed along left sidewall 112A rather than right sidewall 112B. In other examples, pet washtub 100 may include two different sets of corner-adaptor components 148A-148C, with each set uniquely conforming to a different lateral side 112A/112B of washtub 100. In such examples, either or both sets of corner-adaptor components 148 can optionally be installed, as needed.

Figure 6:
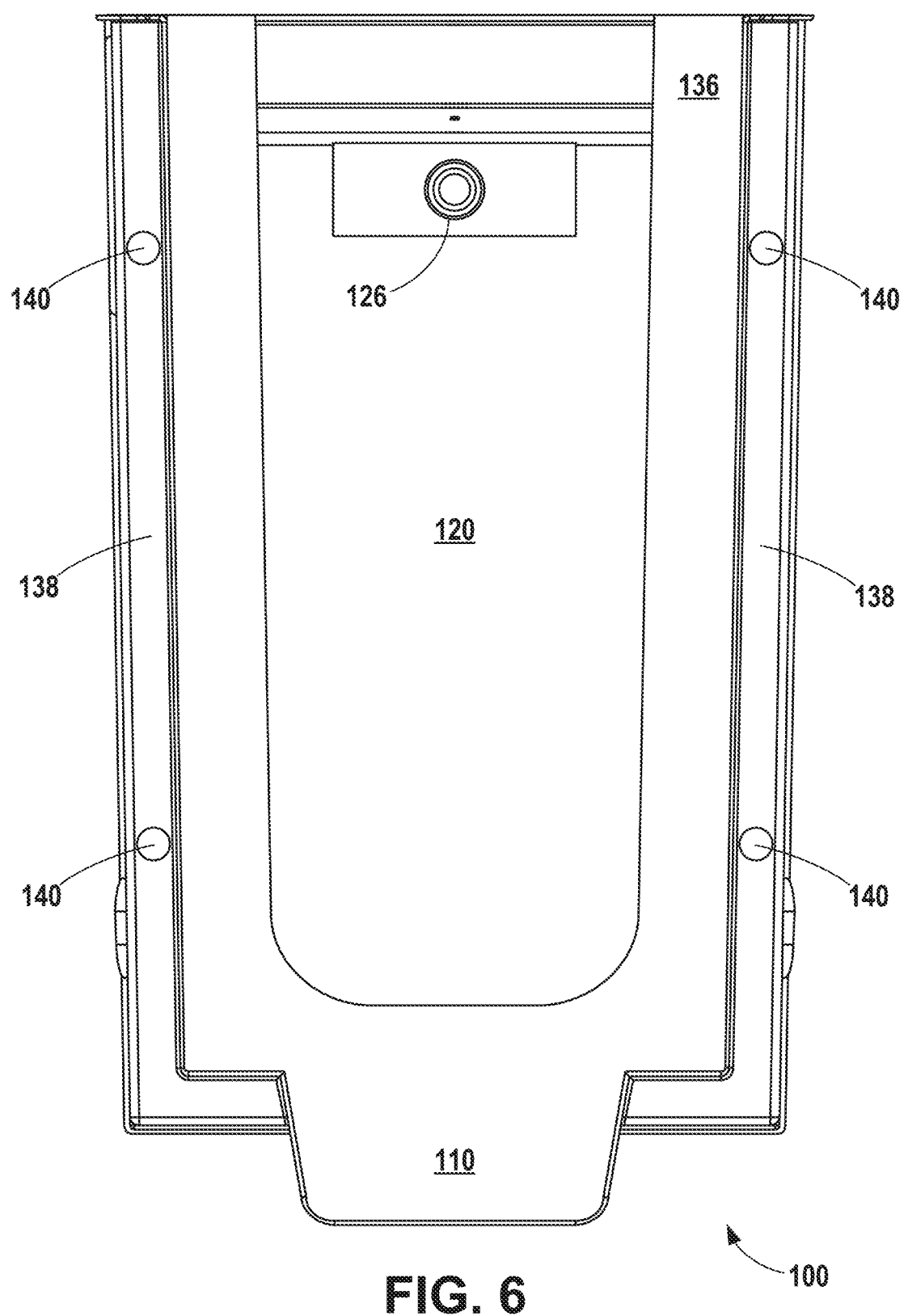
FIG. 6 is a bottom view or underside view of the pet washtub of FIGS. 1-3B.

FIG. 6 is a bottom view or underside view of pet washtub 100, and best illustrates the plurality of ventilation holes 140 spaced along ventilation ledge 138 to provide airflow upward into the interior space between basin 120 and outer housing 122. In the non-limiting example shown, ventilation ledge 138 defines two ventilation holes 140 on either lateral side of washtub 100. In some examples, each pair of holes 140 is spaced apart (along the back-to-front direction) by about 30 to 40 inches (e.g., by about 36 inches). In other examples of washtub 100, ventilation ledge 138 can include more ventilation holes 140, fewer ventilation holes 140, or a different arrangement of ventilation holes 140. Ventilation holes 140 are preferably between about 1 and 4 inches in diameter, such as around two inches in diameter.

Figure 7A:
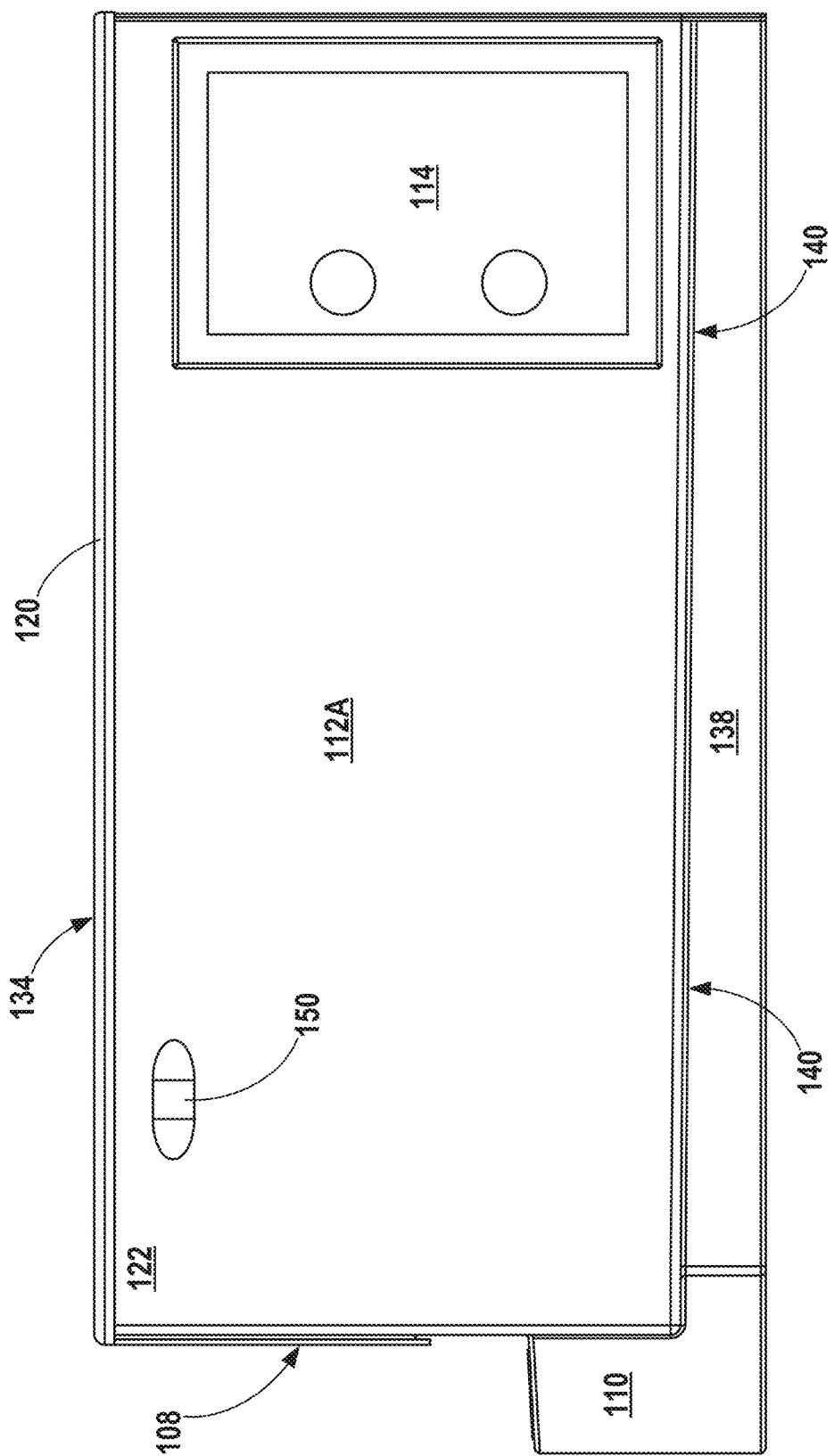
FIG. 7A is a left-side profile view of the pet washtub of FIGS. 1-3B.
Figure 7B:
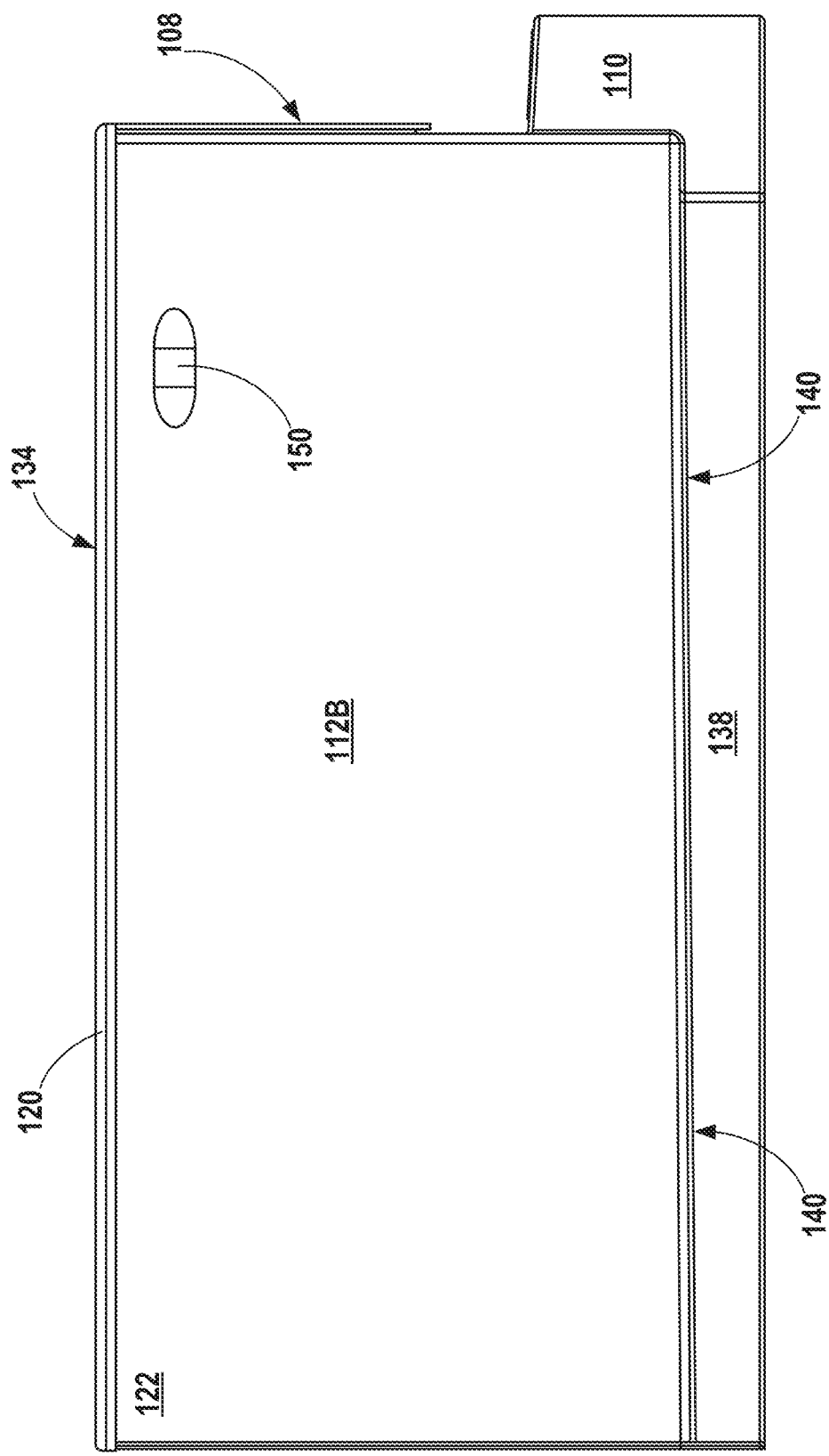
FIG. 7B is a right side profile view of the pet washtub of FIGS. 1-3B.

FIG. 7A is a left-side profile view of pet washtub 100, and FIG. 7B is a right-side profile view of pet washtub 100. In some examples of pet washtub 100 (but not all examples), outer housing 122 is designed to be "invertible," in a manner similar to that described above with respect to corner adaptor 146. That is, in certain examples, left and right sidewalls 112A/112B can be non-destructively removed from the rest of outer housing 122 (e.g., from front step 110 and ventilation ledge 138). In such cases, sidewalls 112A/112B may be inverted (e.g., flipped upside-down) and removably coupled to either lateral side of washtub 100. In this way, a user may select which lateral side of washtub 100 features plumbing-access panel 114, e.g., so that panel 114 is not placed up against a wall, which would prevent the user from opening the panel.

Figure 8A:
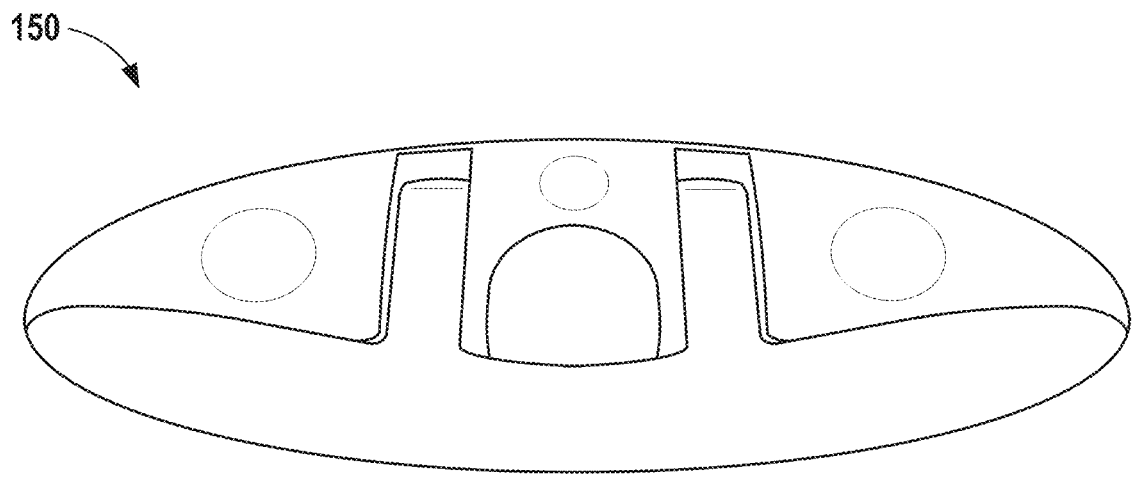
FIG. 8A shows an example rope cleat in a "closed" configuration.
Figure 8B:
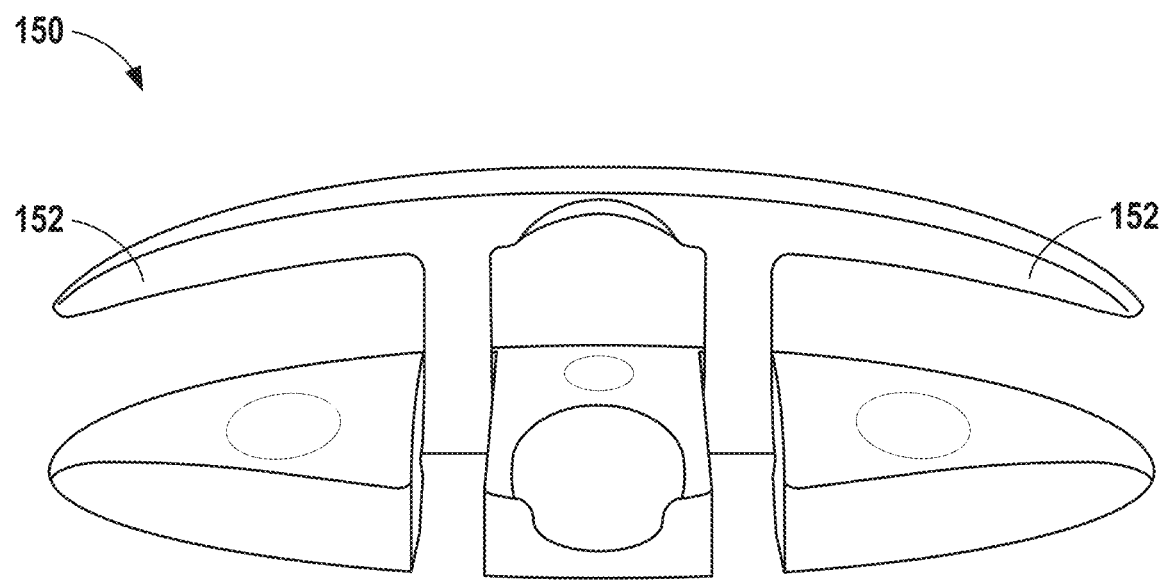
FIG. 8B shows an example rope cleat in an "open" configuration.

In some examples, either or both of housing sidewalls 112A/112B includes a respective rope cleat 150 to help secure the companion animal during grooming. In the example of FIGS. 7A and 7B, the rope cleats are positioned about 12 inches back from the tub's front end 102A, and about 4 inches below the tub's top surface 134. A more detailed example of one of rope cleats 150 is shown in FIGS. 8A and 8B. As shown in FIG. 8A, rope cleat 150 may be folded down into a closed configuration when not in use. As shown in FIG. 8B, at pet-grooming time, rope cleat may 150 may be flipped upward into an open configuration, exposing a pair of opposing lateral prongs 152, e.g., for securing the end of a leash.

Figure 9A:
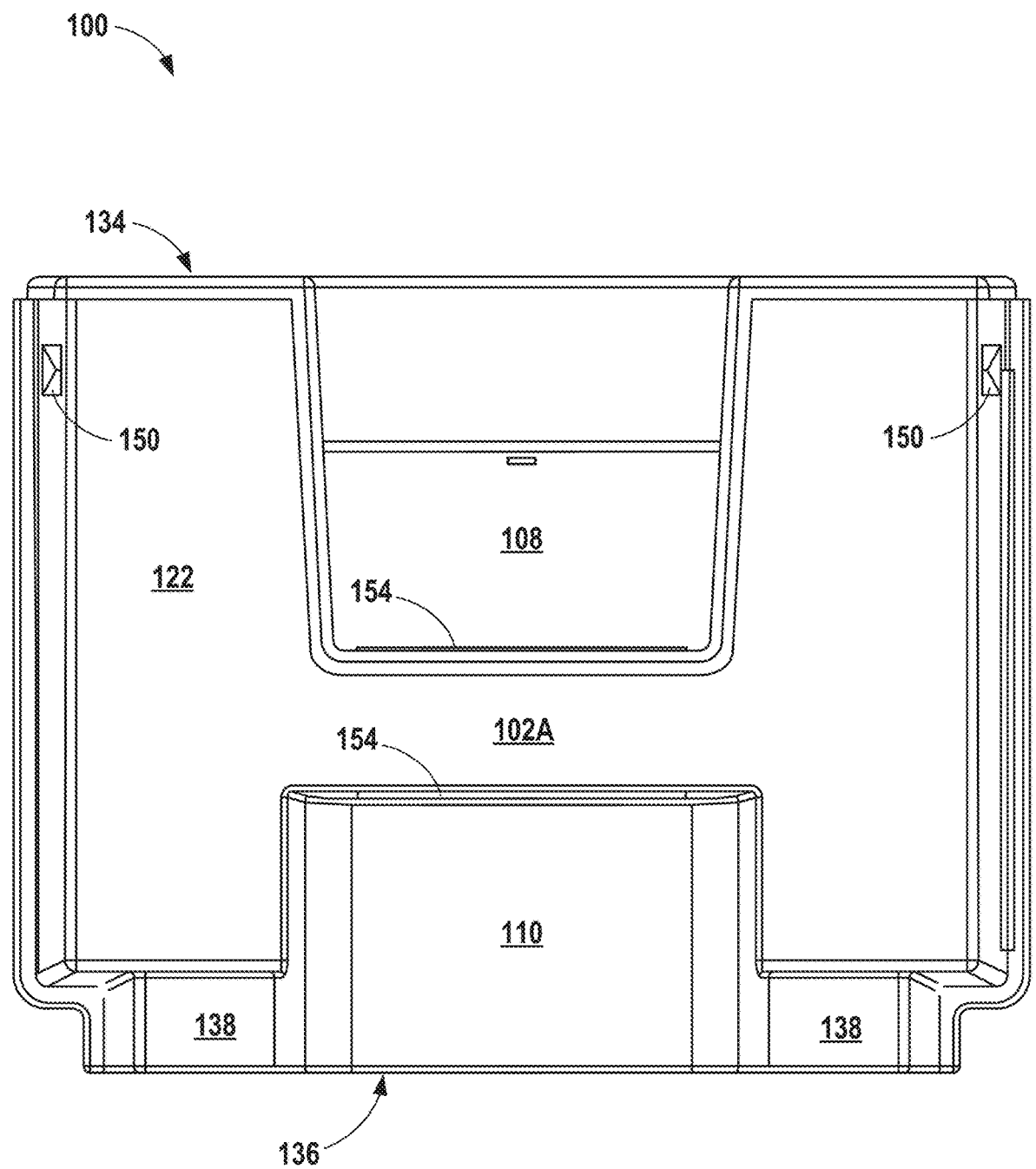
FIG. 9A is a front-end view of the pet washtub of FIGS. 1-3B.

FIG. 9A shows the front end 102A of pet washtub 100. As referenced above, front step 110 extends fully downward to a bottom-most surface 136 of outer housing 122. In some examples, front step 110 and/or entryway 108 can include a high-friction, non-slip upper surface 154, such as a rubber or sandpaper-like mat, adhered or otherwise coupled to the primary material of outer housing 122. Similarly, the bottom surface 124 (FIG. 2) of inner basin 120 and/or the top surface of removable height-adjustment platform 116 (FIG. 1) can include such non-slip surface textures, coatings, or layers.

Figure 9B:
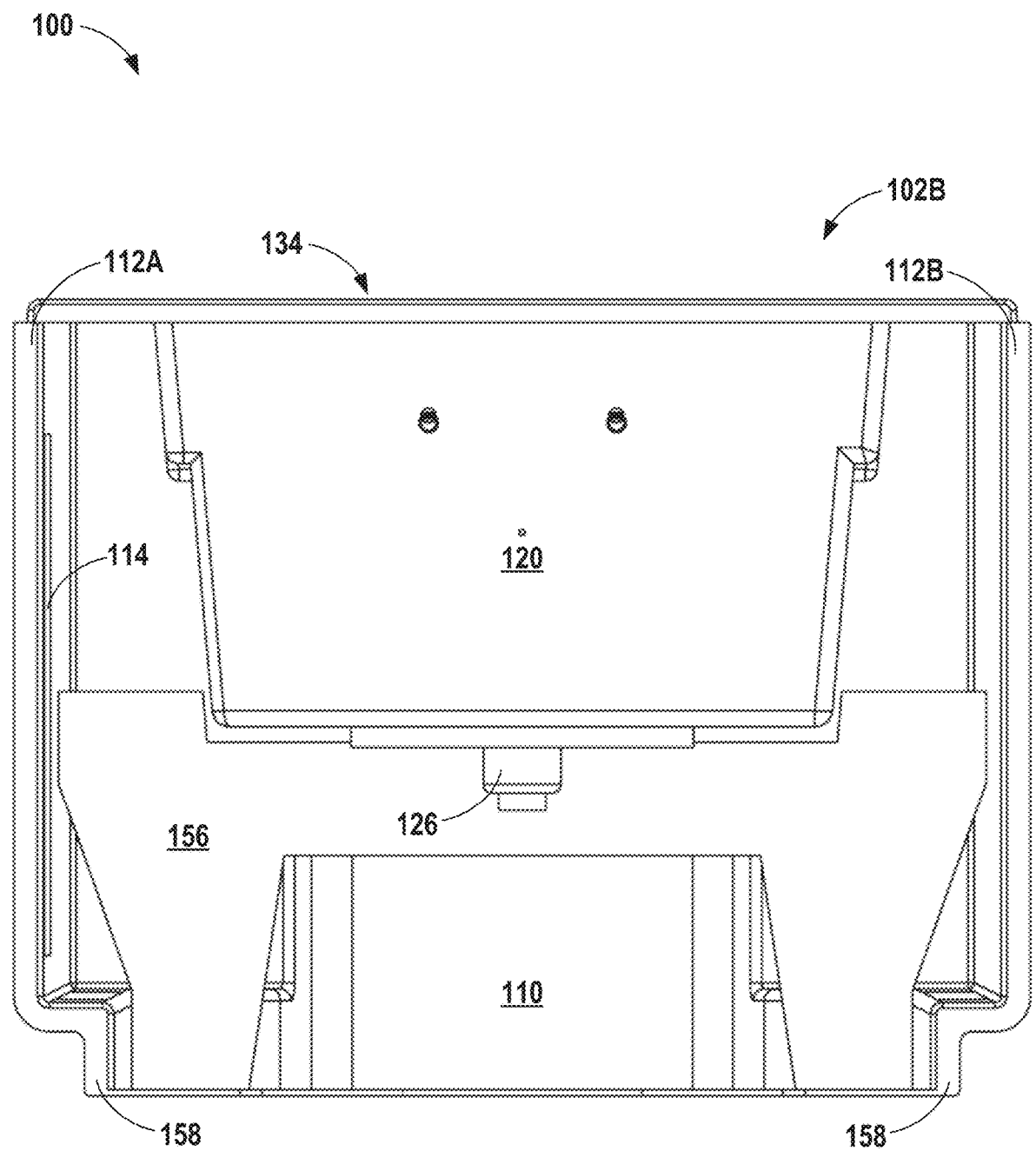
FIG. 9B is a back-end view of the pet washtub of FIGS. 1-3B.

FIG. 9B shows the back end 102B of pet washtub 100. In this example, washtub 100 features an "open" back end 102B, revealing some of the internal components of the tub. For instance, FIG. 9B depicts a generally H-shaped support frame 156 that may be installed underneath inner basin 120 to help support the weight of a companion animal placed therein. In other examples, outer housing 122 can include an additional back panel (not shown) configured to part or all of the back end 102B of the washtub. In some examples, the rear-most ends of housing sidewalls 112A/112B include a lip or wing 158 that curves laterally outward, away from grooming space 104, such that the wing 158 is oriented generally perpendicular to the rest of the sidewall 112. Wings 158 help align the rear end 102B of the washtub up against a "rear" wall 142 of a room, as in the example of FIG. 3A, referenced above.

It is to be understood that the various features described above are merely exemplary, and should not be considered "limiting" in nature. Any, all, or none of the features described may be implemented together, and none may be considered to be "mutually exclusive," other than where explicitly described as such, or where inherently so due to physical constraints.

What is claimed is:

1. A pet washtub for grooming a pet within an interior grooming space thereof, the pet washtub defining a substantially rectangular-prism-shaped outer profile and comprising:
   a front end comprising a front step and defining an entryway into the interior grooming space;
   a back end configured to be positioned adjacent to a back wall of room, wherein a front width of the front end is less than a back width of the back end such that the pet washtub defines a taper along a back-to-front direction;
   a left side;
   a right side; and
   a corner adaptor configured to occlude an elongated gap between the pet washtub and a side wall of the room when the pet washtub is installed in a corner of the room; wherein the corner adaptor comprises: a top wedge configured to occlude a top portion of the gap' a base wedge configured to occlude a front portion of the gap; and a toe cap configured to occlude a bottom portion of the gap.

2. The pet washtub of claim 1, further comprising:
   an outer housing; and
   an inner basin configured to removably couple within the outer housing.

3. The pet washtub of claim 2, wherein the outer housing and the inner basin are both formed from fiberglass.

4. The pet washtub of claim 2, further comprising a removable height-adjustment platform, wherein basin sidewalls of the inner basin define a pair of ledges configured to receive and retain the removable height-adjustment platform.

5. The pet washtub of claim 4, wherein the ledges each define a central depression configured to receive the height-adjustment platform and to prevent forward or backward movement of the height-adjustment platform when received within the central depression of each of the ledges.

6. The pet washtub of claim 4, wherein the removable height-adjustment platform comprises at least one anchor point configured to removably retain a leash to secure the pet.

7. The pet washtub of claim 6, wherein the anchor point comprises:
   an oval-shaped aperture defined by the removable height-adjustment platform; and
   a metal peg extending across the oval-shaped aperture.

8. The pet washtub of claim 4, wherein an upper surface of the height-adjustment platform comprises a non-slip material.

9. The pet washtub of claim 2, wherein the outer housing comprises a ventilation ledge extending below the left side, the front end, and the right side of the pet washtub, wherein the ventilation ledge enables a flow of air to evaporate moisture between the outer housing and the inner basin.

10. The pet washtub of claim 9, wherein the ventilation ledge defines a plurality of ventilation apertures configured to receive the flow of air.

11. The pet washtub of claim 10, wherein the plurality of ventilation apertures comprises a first pair of apertures along the left side of the pet washtub and a second pair of apertures along the right side of the pet washtub.

12. The pet washtub of claim 10, wherein each of the plurality of ventilation apertures is between about one inch and about four inches in diameter.

13. The pet washtub of claim 2, wherein the outer housing comprises a reflective or sparkling exterior surface.

14. The pet washtub of claim 1, wherein the top wedge conforms to a first color and texture of an inner basin of the pet washtub, and wherein the base wedge and the toe cap both conform to a second color and texture of an outer housing of the pet washtub.

15. The pet washtub of claim 1, wherein the corner adaptor is invertible such that the corner adaptor may be arranged to conform to either the left side or the right side of the pet washtub.

16. The pet washtub of claim 1, wherein the left side and the right side of the tub each comprises a collapsible rope cleat configured to secure a leash while grooming the pet.

17. The pet washtub of claim 1, wherein the step extends fully downward to a bottom-most surface of the pet washtub.

18. The pet washtub of claim 1, wherein the front width is about 85% to about 95% as wide as the back width.

* * * * *